United States Patent
Fang et al.

(10) Patent No.: US 8,619,548 B2
(45) Date of Patent: Dec. 31, 2013

(54) PROCESSING METHOD AND TRANSCEIVER FOR CHANNEL CHANGING IN JOINT TRANSCEIVING MODE

(75) Inventors: Liming Fang, Shenzhen (CN); Raphael Cendrillon, Hong Kong (CN); Chin Ngek Hung, San Jose, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 294 days.

(21) Appl. No.: 13/044,263

(22) Filed: Mar. 9, 2011

(65) Prior Publication Data

US 2011/0170578 A1    Jul. 14, 2011

Related U.S. Application Data

(63) Continuation of application No. PCT/CN2009/073130, filed on Aug. 6, 2009.

(30) Foreign Application Priority Data

Sep. 9, 2008  (CN) .......................... 2008 1 0211907

(51) Int. Cl.
    *G01R 31/08*   (2006.01)
(52) U.S. Cl.
    USPC ... 370/216; 370/242; 359/341.44; 379/22.03; 398/17
(58) Field of Classification Search
    USPC ........ 375/240.1, 219; 455/434, 464; 370/208, 370/201, 252, 352
    See application file for complete search history.

(56) References Cited

U.S. PATENT DOCUMENTS

| | | |
|---|---|---|
| 2004/0090927 A1 | 5/2004 | Zimmerman et al. |
| 2005/0105900 A1* | 5/2005 | Akimoto et al. ................ 398/16 |
| 2006/0007993 A1* | 1/2006 | Wang et al. ................... 375/224 |
| 2006/0274893 A1 | 12/2006 | Cioffi et al. |
| 2007/0165533 A1 | 7/2007 | Wu |
| 2009/0290867 A1* | 11/2009 | Zhao ................................ 398/5 |

FOREIGN PATENT DOCUMENTS

| | | |
|---|---|---|
| CN | 101005414 A | 7/2007 |
| CN | 101154964 A | 4/2008 |
| WO | WO 2007/092298 A1 | 8/2007 |

OTHER PUBLICATIONS

State Intellectual Property Office of the People's Republic of China, 1st Office Action in Chinese Application No. 200810211900.5 (Nov. 3, 2011).
European Patent Office, Extended European Search Report in European Application No. 09812628.7 (Mar. 1, 2012).
International Searching Authority, Written Opinion in International Application No. PCT/CN2009/073691 (Dec. 10, 2009).
Hu et al., "Time Division Sub-carrier Semiconductor DFB Laser Mutli-wavelength Locker," Chinese Journal of Quantum Electronics, vol. 20, No. 6, pp. 711-714 (Dec. 2003).

(Continued)

*Primary Examiner* — Andrew Lai
*Assistant Examiner* — Jamaal Henson
(74) *Attorney, Agent, or Firm* — Leydig, Voit & Mayer, Ltd.

(57) ABSTRACT

A processing method and a transceiver for channel changing in a joint transceiving mode are provided. The method includes: performing fault detection for one or more direct channels; after a fault is detected on a direct channel, stopping sending signals on the direct channel; detecting whether the direct channel with fault has been recovered; and when recovery of the direct channel with fault is detected, resuming sending signals on the direct channel.

10 Claims, 8 Drawing Sheets

(56) References Cited

OTHER PUBLICATIONS

1st Office Action in corresponding Chinese Patent Application No. 200810211907.7 (Nov. 2, 2012).

Written Opinion of the International Searching Authority in corresponding PCT Patent Application No. PCT/CN2009/073130 (Nov. 19, 2009).

* cited by examiner

PROCESSING METHOD AND TRANSCEIVER FOR CHANNEL CHANGING IN JOINT TRANSCEIVING MODE

CROSS-REFERENCE TO RELATED APPLICATIONS

This application is a continuation of International Application No. PCT/CN2009/073130, filed on Aug. 6, 2009, which claims priority to Chinese Patent Application No. 200810211907.7, filed on Sep. 9, 2008, both of which are hereby incorporated by reference in their entireties.

FIELD OF THE INVENTION

The present invention relates to the field of communications, and in particular, to a processing method and a transceiver for channel changing in a joint transceiving mode.

BACKGROUND OF THE INVENTION

A Digital Subscriber Line (DSL) is a data transmission technology using a twisted-pair cable for telephone as a transmission medium. An xDSL, as a combination of the transmission technology, includes High-speed Digital Subscriber Line (HDSL), Single-pair High-speed Digital Subscriber Line (SHDSL), and Asymmetric Digital Subscriber Line (ADSL). Except the SHDSL which uses base-band transmission, other xDSLs that use pass-band transmission can coexist on the same twisted-pair cable with Plain Old Telephone Service (POTS) by using frequency division multiplexing technology.

The twisted-pair cable for telephone adopted in the xDSL technology is used as a transmission channel, and its non-distortion channel capacity must satisfy the Shannon channel capacity formula:

$$C = B \cdot \log_2\left(1 + \frac{S}{N}\right)$$

C represents a channel transmission capacity, B represents the signal bandwidth, S represents the signal energy, and N represents the noise energy. It can be seen from the Shannon channel capacity formula that the value of the channel capacity C can be increased by increasing the value of the signal bandwidth B and/or the signal energy S. However, values of both the signal bandwidth and the signal energy have limitations, so that it is difficult to further increase the channel transmission capacity C by increasing the signal bandwidth B or the signal energy S. But from the perspective of the noise energy N, the channel transmission capacity C can be properly increased by lowering the noise energy N.

In practical application, because the pairs of the twisted-pair cables used by the DSL are unshielded, electromagnetic interference among the pairs will result in that the signal on one twisted-pair cable affects the signal on the other twisted-pair cable, that is, a crosstalk problem will be very obvious. Thus, in order to increase the transmission capacity of the xDSL, the crosstalk problem of the xDSL needs to be solved. With respect to the crosstalk problem, in the conventional art, a vector DSL technology is proposed, which neutralizes the crosstalk by using a joint transceiving mode.

In the joint transceiving, a sending filter for joint sending and a receiving filter for joint receiving are mainly implemented according to a crosstalk relationship among a group of lines. When the filters are implemented properly, most crosstalk noises are neutralized, so as to greatly increase a Signal to Noise Ratio (SNR), thereby a channel capacity or a line rate is greatly increased. However, when the filters for joint sending and joint receiving are not properly implemented, the crosstalk noises will be even increased rather than being neutralized. Therefore, in an xDSL system using joint transceiving, the changes of the channel must be continuously monitored during a working process, and the filters for joint sending and joint receiving must be adjusted accordingly, so as to ensure that the filters are always properly implemented. In some cases, the technology is referred to as channel tracking technology. In the current application, channels to be monitored include a direct channel and a crosstalk channel.

The current channel tracking technology is normally applicable to slow changes of the channel. For tracking of a downlink channel, a decided signal error of a receiving end is fed back to a sending end, and then an adaptive technology is adopted at the sending end to update the filter for joint sending, so that the filter for joint sending is adapted to the changes of the channel. For tracking of an uplink channel, a filter for joint receiving is also updated according to a decided signal error feedback, while a slight difference between the tracking of a downlink channel and the tracking of an uplink channel is that an uplink error does not need to be fed back through the channel.

In a process of implementing the conventional art, the inventors find that the prior art at least has the following problems.

A case of an unconventional change of a crosstalk channel is that in a group of lines on which joint transceiving has already been implemented, the impedance of a certain line sometimes will be suddenly changed greatly due to various causes, for example, terminal power off, terminal offline, or broken line, so that the crosstalk channel among the lines instantly undergoes a great change. The change cannot be solved by using the conventional channel tracking technology. Failure to be adapted to the change of the channel within a quite short period of time will result in increasing of line error codes or even offline, which will seriously affect Quality of Service (QoS).

SUMMARY OF THE INVENTION

The embodiments of the present invention provide a processing method, a transceiver, and a data transmission system for channel changing in a joint transceiving mode, capable of solving a problem of reducing the QoS due to a change of a channel in a joint transceiving mode.

In order to achieve the objective, an embodiment of the present invention provides a processing method for channel changing in a joint transceiving mode, where the method includes:

performing fault detection for one or more direct channels;

after a fault is detected on a direct channel, stopping sending signals on the direct channel with fault;

detecting whether the direct channel with fault has been recovered; and when recovery of the direct channel with fault is detected, resuming sending signals on the direct channel.

In order to achieve the objective, an embodiment of the present invention provides a transceiver, where the transceiver includes:

a fault detection unit, configured to perform fault detection for one or more direct channels implementing joint transceiving processing;

a sending stopping unit, configured to stop sending and receiving signals on the direct channel with fault after a fault is detected on a direct channel; and a fault recovery detection unit, configured to detect whether the direct channel with fault has been recovered.

In order to achieve the objective, an embodiment of the present invention provides a transceiver system, where the system includes:

at least two transceivers and transmission channels connecting transceiver 1 with transceiver 2, in which the transmission channels include at least 2 direct channels;

the transceiver 1 sends signals to the transceiver 2 on the transmission channels, and after a fault occurs on a direct channel of the transmission channels, stops sending signals on the direct channel with fault; after stopping sending the signals, the transceiver 1 sends a detection signal to the transceiver 2 on the direct channel with fault, and after the fault of the direct channel is recovered, the transceiver 1 resumes sending the signals to the transceiver 2 on the direct channel.

In order to achieve the objective, an embodiment of the present invention provides a data transmission system, where the system includes: at least two transceivers and at least two direct channels connected to the at least two transceivers, in which each transceiver includes:

a fault detection unit, configured to perform fault detection for one or more direct channels implementing joint transceiving processing;

a sending stopping unit, configured to stop sending and receiving signals on the direct channel with fault when detecting a fault on a direct channel; and a fault recovery detection unit, configured to detect whether the direct channel with fault has been recovered.

In the processing method, after a fault occurs on a direct channel, signal sending on the direct channel with fault is stopped. That is, according to embodiments of the present invention, the transceiver, and the data transmission system for the channel changing in the joint transceiving mode in a group of transmission channels for joint transceiving, could prevent the direct channel with fault from affecting crosstalk channels of other direct channels. In addition, when it is detected that the direct channel with fault has been recovered, signal sending on the direct channel is resumed, so as to ensure QoS and prevent a problem of reducing QoS due to the change of the channel.

BRIEF DESCRIPTION OF THE DRAWINGS

To illustrate the technical solutions according to the embodiments of the present invention or in the conventional art more clearly, the accompanying drawings for describing the embodiments or the conventional art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solution of the present invention is clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

The embodiments of the present invention provide a processing method, a transceiver, and a data transmission system for channel changing in a joint transceiving mode, capable of solving a problem of reducing QoS due to a change of a channel in a joint transceiving mode. Embodiments of the present invention are described in detail with reference to the accompanying drawings.

Figure 10:
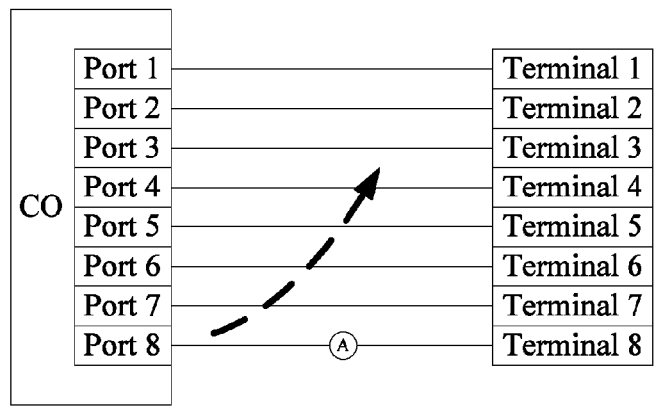
FIG. 10 is a schematic diagram of a joint transceiving mode according to an embodiment of the present invention.

In most cases, a sudden change of a crosstalk channel is due to a sudden change of a direct channel. Taking FIG. 10 as an example, altogether 8 lines at a CO end implement joint transceiving processing. A line of port 8 fails at a point A due to a certain reason, which causes that a direct channel between the port 8 of the CO end and a terminal 8 is greatly changed, so that an SNR of the port 8 is decreased rapidly or the port 8 even fails to work normally. Meanwhile, crosstalk channels of the port 8 to other lines, assuming channels of ports 1, 2, and 3, are also changed. In view of the result, the SNRs of every affected line are decreased. Based on the above description, attenuation of a direct channel of the line with fault causes the SNR to be decreased, and the SNRs of other lines are decreased due to the change of the crosstalk channels, which is, the increasing of the crosstalk. Thus, it is necessary to detect whether the direct channel is greatly changed. Once it is detected that the direct channel is greatly changed, it is necessary to stop sending signals on the line, so as to reduce continuous interferences on other lines. However, if the fault is recovered after a period of time, a service on the line will be recovered according to relevant requirements. It is necessary to continuously detect whether the line with the fault point has been recovered, and a service should be immediately recovered if the recovery of the fault is detected.

Figure 1:
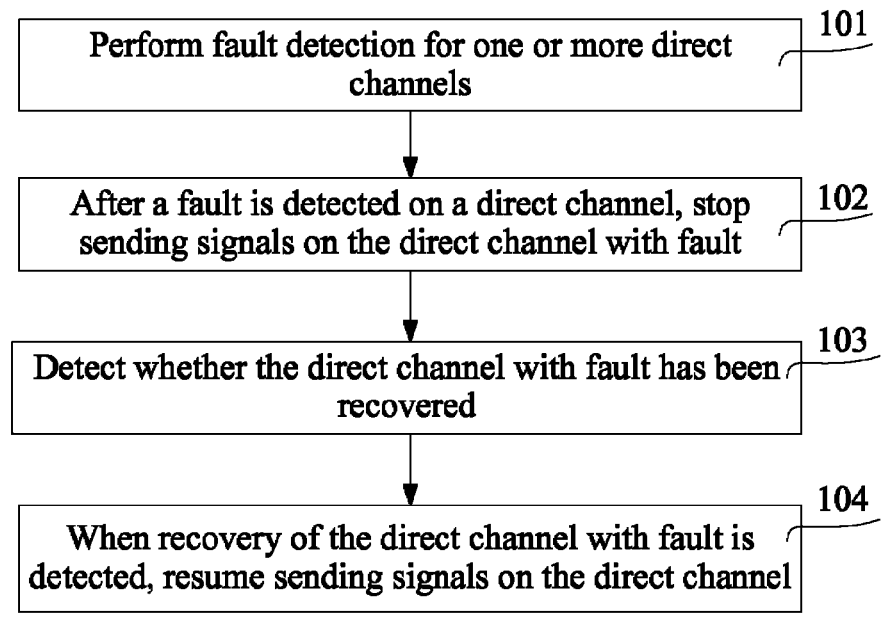
FIG. 1 is a flow chart of a processing method for channel changing in a joint transceiving mode according to an embodiment of the present invention.

As shown in FIG. 1, the present invention provides a processing method for channel changing in a joint transceiving mode, which includes the following steps:

Step 101: Perform fault detection for one or more direct channels.

Step 102: after a fault is detected on a direct channel, stop sending signals on the direct channel with fault.

Step 103: Detect whether the direct channel with fault has been recovered.

Step 104: When recovery of the direct channel with fault is detected, resume sending signals on the direct channel.

Figure 2:
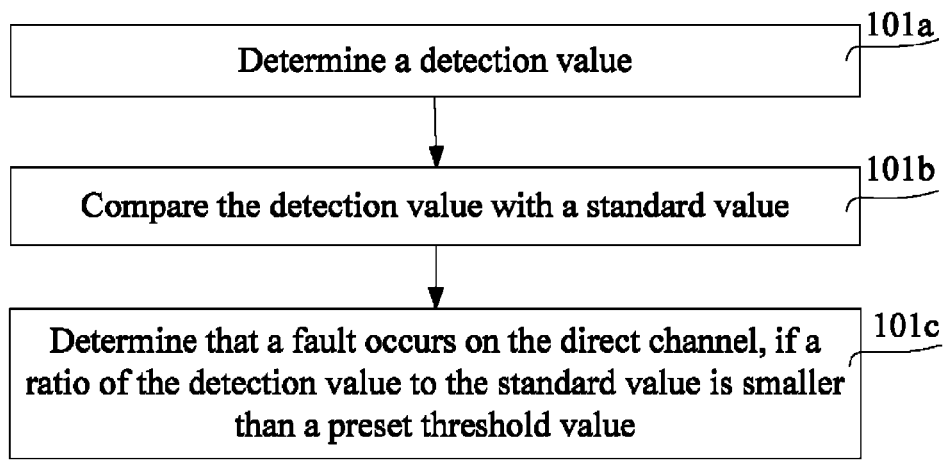
FIG. 2 is a flow chart of fault detection for a direct channel according to an embodiment of the present invention.

As shown in FIG. 2, which illustrates the step 101 in FIG. 1, for example, the fault detection is performed for a direct channel, which is specifically described in the following:

A time domain energy detection method may be adopted to detect a change of total energy of the signals transmitted on the direct channel, so as to determine whether the fault occurs on the direct channel, which specifically includes the following steps:

Step 101a: Within one symbol period, square sampling values at sampling points of each time domain signal, and add the squares to obtain a detection value ($TE_{new}$).

Step 101b: Compare the detection value ($TE_{new}$) with a standard value ($TE_{std}$).

Step 101c: If a ratio of the detection value ($TE_{new}$) to the standard value ($TE_{std}$) is smaller than a preset threshold value, for example, one forth, one second, or two thirds, determine that the fault occurs on the direct channel.

Figure 3:
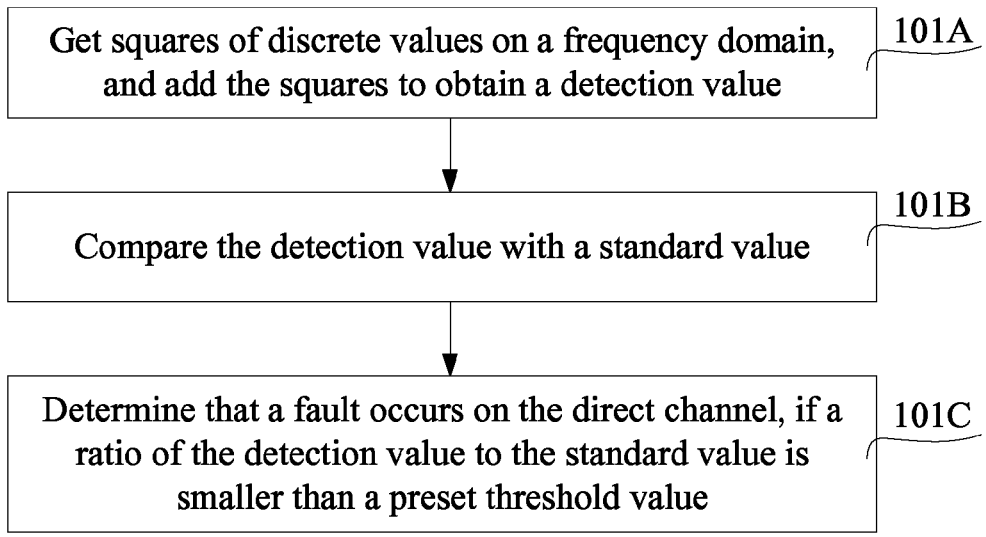
FIG. 3 is a flow chart of another fault detection for a direct channel according to an embodiment of the present invention.

As shown in FIG. 3, a frequency domain energy detection method may be adopted to detect a change of total energy of signals transmitted on a direct channel, so as to determine whether a fault occurs on the direct channel. For example, for a discrete multi-tone modulation DSL, a time domain signal in a symbol may be transformed into a frequency domain signal through Fast Fourier Transform (FFT), so as to count energy of the signals on a frequency spectrum, which includes the following specific steps:

Step 101A: Get squares of discrete values on a frequency domain, and add the squares to obtain a detection value ($FE_{new}$).

Step 101B: Compare the detection value ($FE_{new}$) with a standard value ($FE_{std}$).

Step 101C: If a ratio of the detection value ($FE_{new}$) to the standard value ($FE_{std}$) is smaller than a preset threshold value, for example, one forth, one second, or two thirds, determine that the fault occurs on the direct channel.

Figure 4:
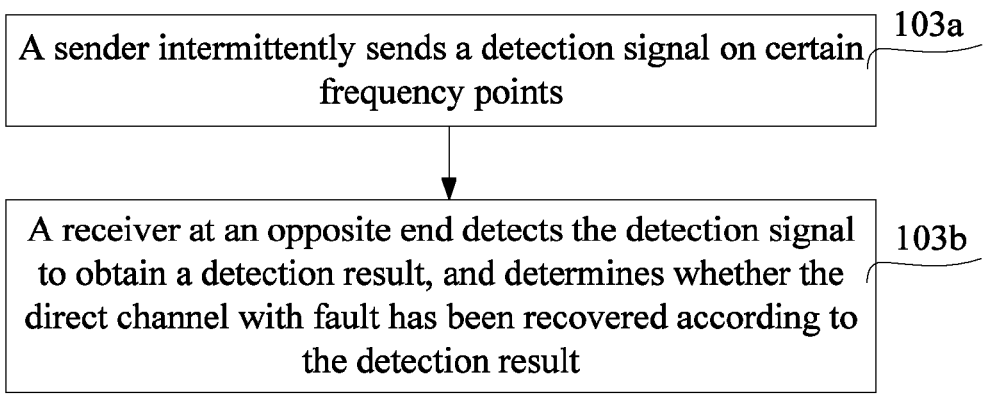
FIG. 4 is a flow chart of fault recovery detection for a direct channel according to an embodiment of the present invention.
Figure 11:
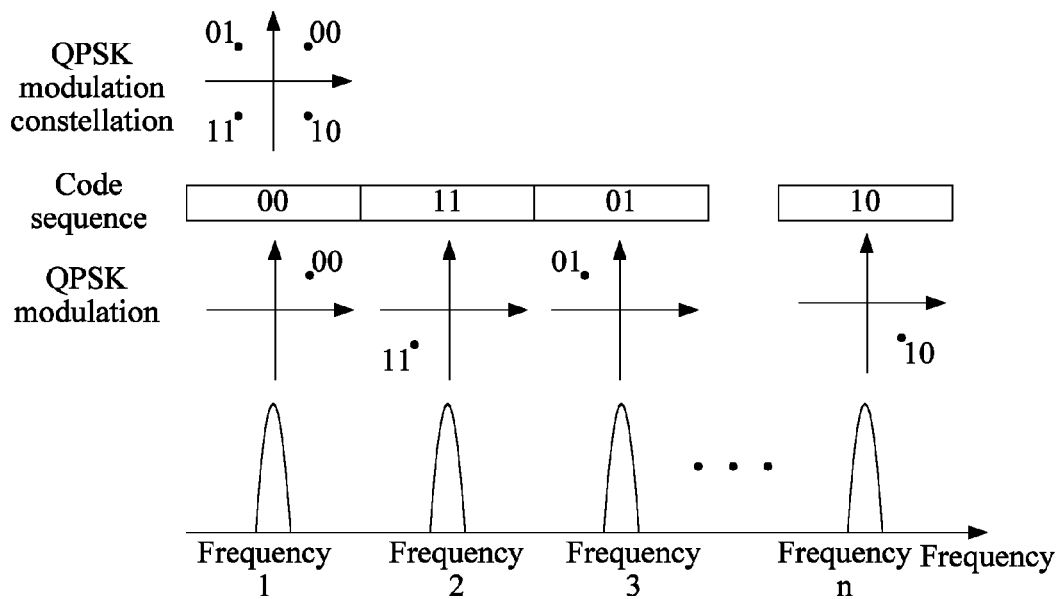
FIG. 11 is a schematic diagram of a modulation mode and a code sequence according to an embodiment of the present invention.

As shown in FIG. 4, which illustrates the step 103 in FIG. 1, detect whether the direct channel with fault has been recovered, which specifically includes the following steps:

Step 103a: A sender intermittently sends a detection signal at some frequency points, in which the detection signal has a certain interval in frequency domain and time; in addition, the sender sends a detection signal with a preset parameter and a preset modulation mode according to a preset frequency. For example, a Quadrature Phase Shift Keying (QPSK) modulation mode is defined, as shown in FIG. 11.

Step 103b: A receiver at an opposite end detects the detection signal to obtain a detection result, and determines whether the direct channel with fault has been recovered according to the detection result.

The step 103b further includes the following steps:

Step 103b1: The receiver at the opposite end generates a reference signal according to the preset parameter and the preset modulation mode.

Step 103b2: After receiving a signal of a symbol, the receiver at the opposite end performs related calculation on the received signal of the symbol and the reference signal, and if a result of the related calculation is greater than a first preset threshold value, the receiver determines that the direct channel with fault has been recovered.

The step 103b may also include the following steps:

A code sequence is preset, as shown in FIG. 11. The receiver at the opposite end processes the received signal, for example, implements QPSK demodulation, as shown in FIG. 11, so as to obtain a received code sequence, the receiver compares the received code sequence with the preset code sequence, and if the number of same bits reaches a preset ratio of the number of total bits, determines that the direct channel with fault has been recovered. Alternatively, the receiver at the opposite end processes the received signal to obtain the received code sequence, performs related calculation on the received code sequence and the preset code sequence, and determines that the direct channel with fault has been recovered, if a value of the related calculation is greater than a second preset threshold value.

The following problems need to be considered when detecting whether a fault point has been recovered. Firstly, the average total energy of a probe signal may not be too high, so as to ensure small crosstalk on other lines due to the probe signal. Secondly, the detection of the probe signal must have certain robustness; if the average total energy of a probe signal is too high or the detection of the probe signal does not have certain robustness, false triggering of line recovery may be caused, so as to result in big crosstalk.

In the processing method for the channel changing in the joint transceiving mode according to the embodiments of the present invention, in a group of transmission channels for joint transceiving, after a fault occurs on a direct channel, signal sending on the direct channel with fault is stopped, so as to prevent the direct channel with fault from affecting crosstalk channels of other direct channels. In addition, when it is detected that the direct channel with fault has been recovered, signal sending on the direct channel is resumed, so as to ensure QoS and prevent a problem of reducing QoS due to the change of the channel.

Figure 5:
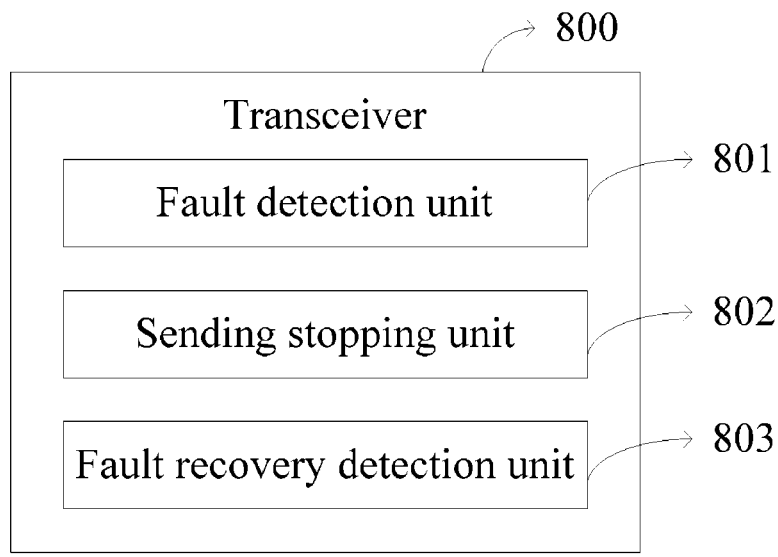
FIG. 5 is a structural block diagram of a transceiver according to an embodiment of the present invention.

As shown in FIG. 5, the present invention further provides a transceiver 800, which includes a fault detection unit 801, a sending stopping unit 802, and a fault recovery detection unit 803.

The fault detection unit 801 is configured to perform fault detection for one or more direct channels implementing joint transceiving processing.

The sending stopping unit 802 is configured to stop sending and receiving signals on the direct channel with fault when detecting a fault on a direct channel.

The fault recovery detection unit 803 is configured to detect whether the direct channel with fault has been recovered.

Figure 6:
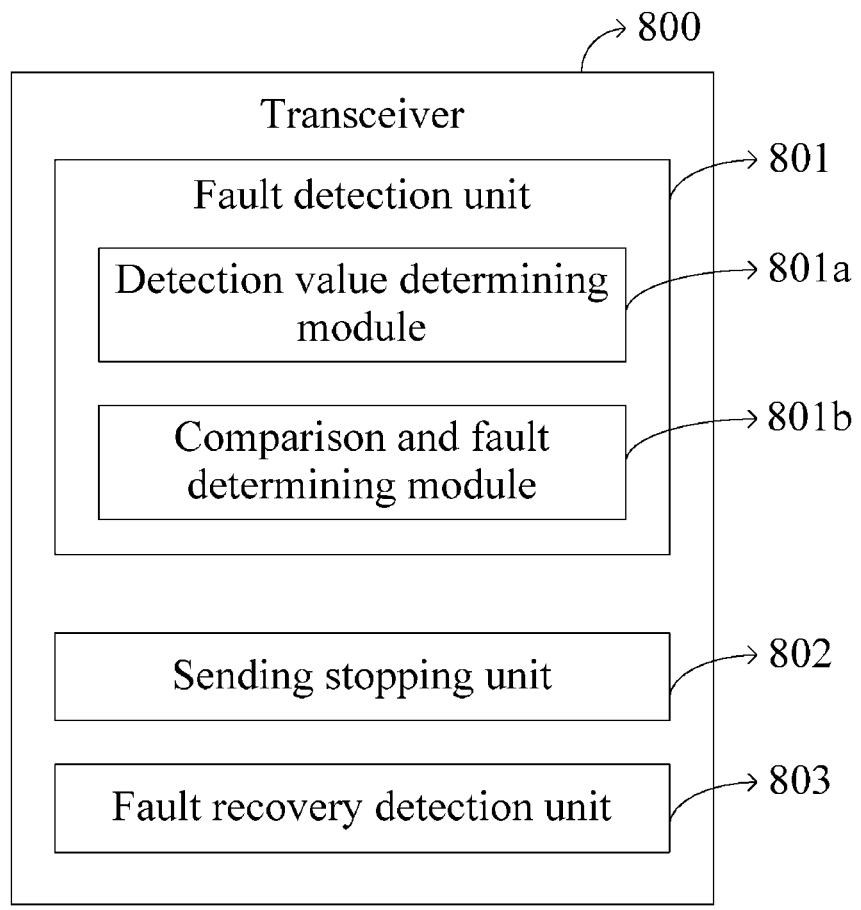
FIG. 6 is a structural block diagram of a transceiver according to another embodiment of the present invention.

As shown in FIG. 6, in an embodiment of the present invention, the fault detection unit 801 includes a detection value determining module 801a and a comparison and fault determining module 801b.

The detection value determining module 801a is configured to square sampling values at sampling points of each time domain signal, and add the squares to obtain a detection value within one symbol period.

The comparison and fault determining module 801b is configured to compare the detection value with a standard value, and if a ratio of the detection value to the standard value is smaller than a preset threshold value, determine the direct channel with fault.

In another embodiment of the present invention, the fault detection unit 801 includes a detection value determining module 801A and a comparison and fault determining module 801B.

The detection value determining module 801A is configured to get squares of discrete values on a frequency domain, and add the squares to obtain a detection value.

The comparison and fault determining module 801B is configured to compare the detection value with a standard value, and if a ratio of the detection value to the standard value is smaller than a preset threshold value, determine the direct channel with fault.

Figure 7:
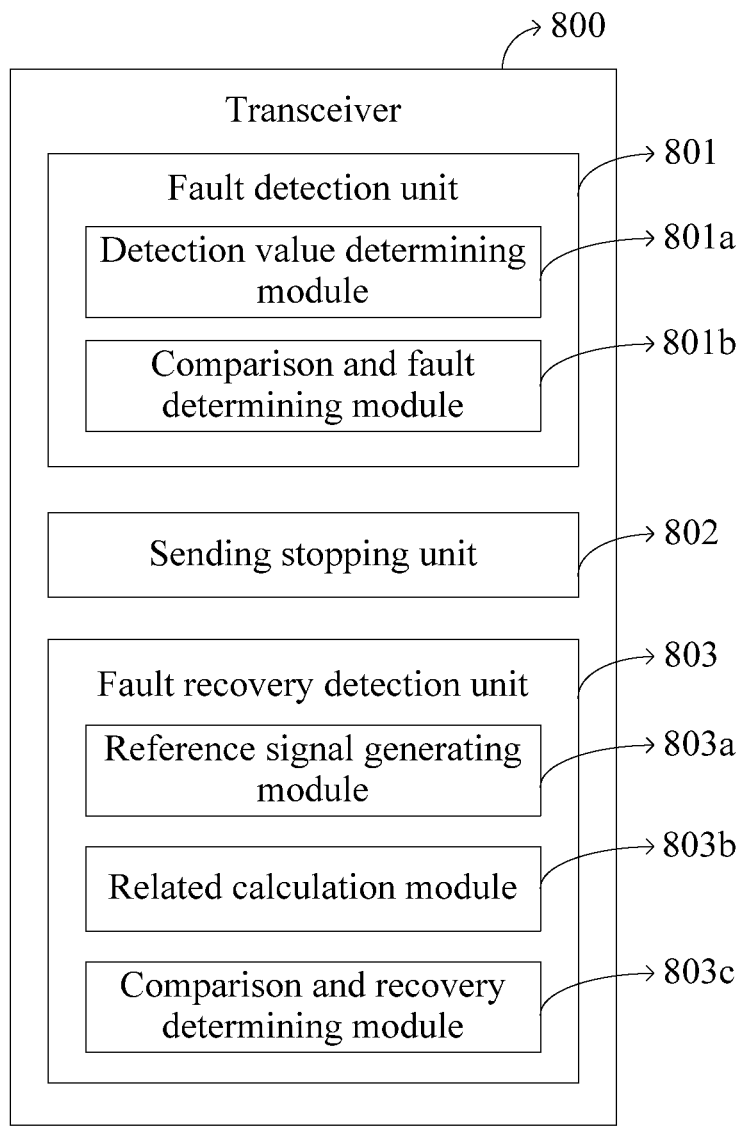
FIG. 7 is a structural block diagram of a transceiver according to another embodiment of the present invention.

As shown in FIG. 7, in an embodiment of the present invention, the fault recovery detection unit 803 includes a reference signal generating module 803a, a related calculation module 803b, and a comparison and recovery determining module 803c.

The reference signal generating module 803a is configured to generate a reference signal according to a preset parameter and a preset modulation mode.

The related calculation module 803b is configured to perform related calculation on a signal of a symbol received by the transceiver and the reference signal, and obtain a result of the related calculation.

The comparison and recovery determining module 803c is configured to compare the result of the related calculation with a first preset threshold value, and if the result of the related calculation is greater than the first preset threshold value, determine that the direct channel with fault has been recovered.

Figure 8:
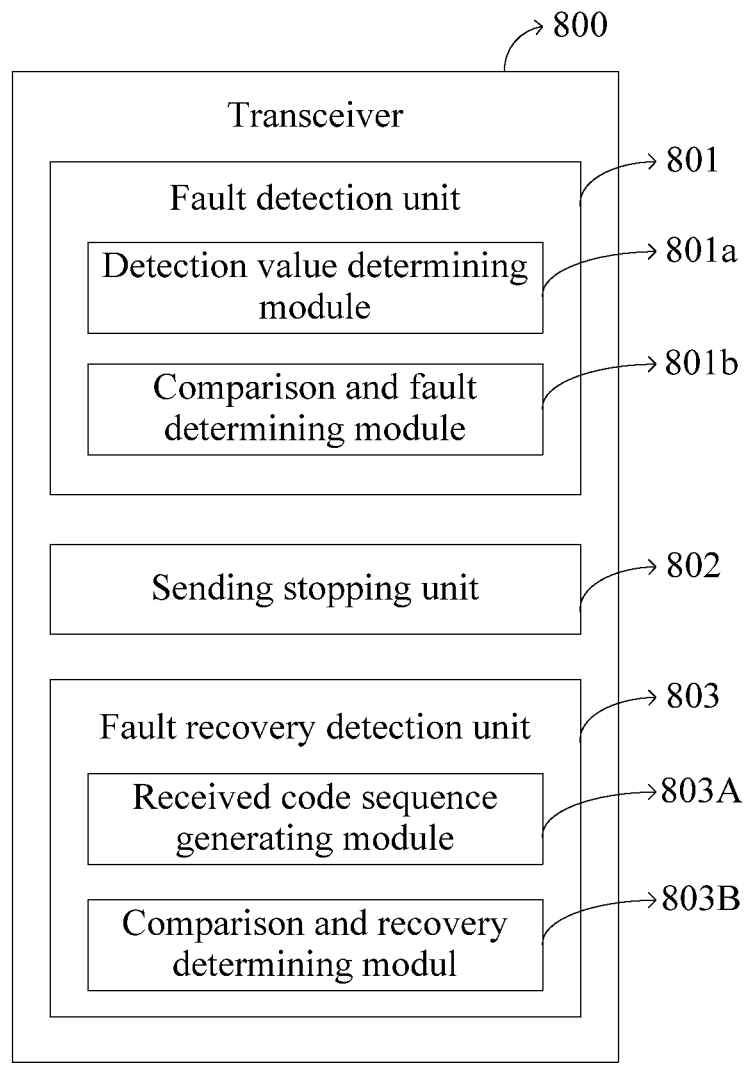
FIG. 8 is a structural block diagram of a transceiver according to another embodiment of the present invention.

As shown in FIG. 8, in another embodiment of the present invention, the fault recovery detection unit 803 includes a received code sequence generating module 803A and a comparison and recovery determining module 803B.

The received code sequence generating module 803A is configured to process a received signal to obtain a received code sequence.

The comparison and recovery determining module 803B is configured to compare the received code sequence with a preset code sequence, and if the number of same bits reaches a preset ratio of the number of total bits, determine that the direct channel with fault has been recovered.

Figure 9:
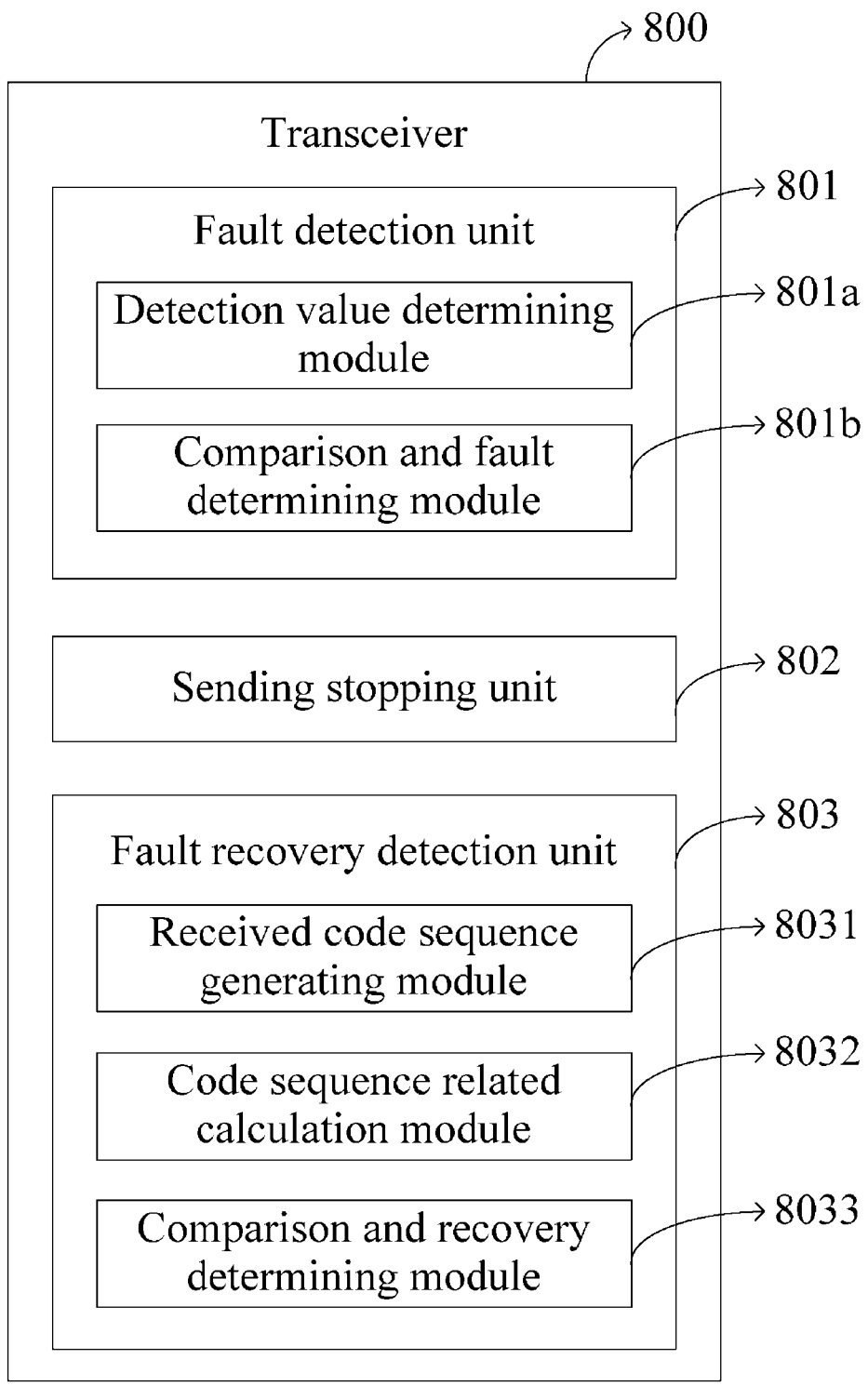
FIG. 9 is a structural block diagram of a transceiver according to another embodiment of the present invention.

As shown in FIG. 9, in another embodiment of the present invention, the fault recovery detection unit 803 includes a received code sequence generating module 8031, a code sequence related calculation module 8032, and a comparison and recovery determining module 8033.

The received code sequence generating module 8031 is configured to process a received signal to obtain a received code sequence;

The code sequence related calculation module 8032 is configured to perform related calculation on the received code sequence and the preset code sequence, and obtain a value of the related calculation.

The comparison and recovery determining module 8033 is configured to compare the value of the related calculation with a second preset threshold value, and if the value of the related calculation is greater than the second preset threshold value, determine that the direct channel with fault has been recovered.

In the transceiver according to the embodiments of the present invention, in a group of transmission channels for joint transceiving, after a fault occurs on a direct channel, signal sending on the direct channel with fault is stopped, so as to prevent the direct channel with fault from affecting crosstalk channels of other direct channels. In addition, when it is detected that the direct channel with fault has been recovered, signal sending on the direct channel is resumed, so as to ensure QoS and prevent a problem of reducing QoS due to the change of the channel.

Figure 12:
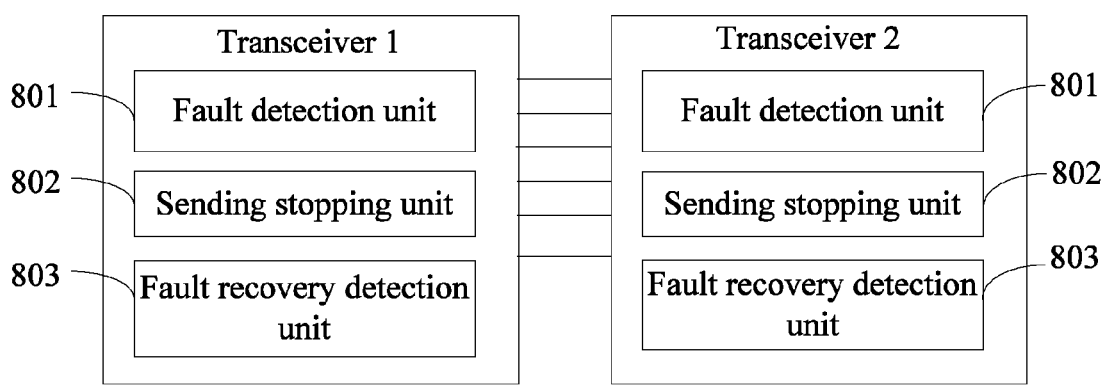
FIG. 12 is a schematic structural view of a data transmission system according to an embodiment of the present invention.

As shown in FIG. 12, the present invention further provides a data transmission system, which includes at least two transceivers and at least two direct channels connected to the at least two transceivers, in which each transceiver includes a fault detection unit 801, a sending stopping unit 802, and a fault recovery detection unit 803.

The fault detection unit 801 is configured to perform fault detection for one or more direct channels implementing joint transceiving processing;

The sending stopping unit 802 is configured to stop sending and receiving signals on the direct channel with fault when detecting a fault on a direct channel.

The fault recovery detection unit 803 is configured to detect whether the direct channel with fault has been recovered.

Internal structures and functions of the transceivers in the embodiment of the present invention are the same as those of the transceivers described in the previous embodiments, and will not be repeated here.

The above descriptions are merely embodiments of the present invention, but not intended to limit the protection scope of the present invention. Any variation or replacement that can be easily thought of by persons skilled in the art should fall within the protection scope of the present invention. Therefore, the protection scope of the present invention shall be based on that of the claims.

What is claimed is:

1. A processing method in a joint transceiving mode
    determining whether a fault occurs on a direct channel by detecting a change of total energy of signals transmitted on the direct channel;
    after a fault is detected on the direct channel, stopping sending signals the direct channel with fault;
    detecting whether the direct channel with fault has been recovered based on a detection result of a detection signal that is sent on the direct channel after the fault is detected; and
    when recovery of the direct channel with fault is detected, resuming sending signals on the direct channel;
    wherein determining whether the fault occurs on the direct channel by detecting the change of the total energy of the signals transmitted on the direct channel comprises:
    getting squares of discrete values on a frequency domain, and adding the squared sampling values to obtain a detection value; comparing the detection value with a standard value; and if a ratio of the detection value to the standard value is smaller than a preset threshold value, determining that the fault occurs on the direct channel.

2. The processing method according to claim 1, wherein the detection result is determined by a receiver at an opposite end based on a related calculation on a received signal of a symbol and a reference signal that is generated in a preset parameter and a preset modulation mode, wherein if a result of the related calculation is greater than a first preset threshold value, the receiver determines that the direct channel with fault has been recovered.

3. A transceiver system, comprising a transceiver, wherein the transceiver comprises:
    a fault detection unit, configured to perform fault detection for one or more direct channels implementing joint transceiving processing;
    a sending stopping unit, configured to stop sending signals on the direct channel with fault when detecting a fault on a direct channel; and
    a fault recovery detection unit, configured to detect whether the direct channel with fault has been recovered;
    wherein the fault detection unit comprises:
    a detection value determining module, configured to get squares of discrete values on a frequency domain, and adding the squared sampling values to obtain a detection value; and a comparison and fault determining module, configured to compare the detection value with a standard value, and if a ratio of the detection value to the standard value is smaller than a preset threshold value, determine the direct channel with fault.

4. The transceiver system according to claim 3, wherein the fault recovery detection unit comprises:
   a reference signal generating module, configured to generate a reference signal according to a preset parameter and a preset modulation mode;
   a related calculation module, configured to perform related calculation on a signal of a symbol received by a receiver and the reference signal, and obtain a result of the related calculation; and
   a comparison and recovery determining module, configured to compare the result of the related calculation with a first preset threshold value, and if the result of the related calculation is greater than the first preset threshold value, determine that the direct channel with fault has been recovered.

5. The transceiver system according to claim 3, wherein the fault recovery detection unit comprises:
   a received code sequence generating module, configured to process a received signal to obtain a received code sequence; and
   a comparison and recovery determining module, configured to compare the received code sequence with a preset code sequence, and if the number of same bits between the received code sequence and the preset code sequence reaches a preset ratio of the number of total bits of the preset code sequence, determine that the direct channel with fault has been recovered.

6. The transceiver system according to claim 3, wherein the fault recovery detection unit comprises:
   a received code sequence generating module, configured to process a received signal to obtain a received code sequence;
   a code sequence related calculation module, configured to perform related calculation on the received code sequence and the preset code sequence, and obtain a value of the related calculation; and
   a comparison and recovery determining module, configured to compare the value of the related calculation with a second preset threshold value, and if the value of the related calculation is greater than the second preset threshold value, determine that the direct channel with fault has been recovered.

7. A data transmission system comprising: at least two transceivers and at least two direct channels connected to the at least two transceivers, wherein each transceiver comprises:
   a fault detection unit, configured to perform fault detection for one or more direct channels implementing joint transceiving processing;
   a sending stopping unit, configured to stop sending signals on the direct channel with fault when detecting a fault on a direct channel; and
   a fault recovery detection unit, configured to detect whether the direct channel with fault has been recovered;
   wherein the fault detection unit comprises: a detection value determining module, configured to get squares of discrete values on a frequency domain, and add the squares to obtain a detection value; and a comparison and fault determining module, configured to compare the detection value with a standard value, and if a ratio of the detection value to the standard value is smaller than a preset threshold value, determine the direct channel with fault.

8. The data transmission system according to claim 7, wherein the fault recovery detection unit comprises:
   a reference signal generating module, configured to generate a reference signal according to a preset parameter and a preset modulation mode;
   a related calculation module, configured to perform related calculation on a signal of a symbol received by the transceiver and the reference signal, and obtain a result of the related calculation; and
   a comparison and recovery determining module, configured to compare the result of the related calculation with a first preset threshold value, and if the result of the related calculation is greater than the first preset threshold value, determine that the direct channel with fault has been recovered.

9. The data transmission system according to claim 7, wherein the fault recovery detection unit comprises:
   a received code sequence generating module, configured to process a received signal to obtain a received code sequence; and
   a comparison and recovery determining module, configured to compare the received code sequence with a preset code sequence, and if the number of same bits between the received code sequence and the preset code sequence reaches a preset ratio of the number of total bits of the preset code sequence, determine that the direct channel with fault has been recovered.

10. The data transmission system according to claim 7, wherein the fault recovery detection unit comprises:
   a received code sequence generating module, configured to process a received signal to obtain a received code sequence;
   a code sequence related calculation module, configured to perform related calculation on the received code sequence and a preset code sequence, and obtain a result of the related calculation; and
   a comparison and recovery determining module, configured to compare the value of the related calculation with a second preset threshold value, and if the value of the related calculation is greater than the second preset threshold value, determine that the direct channel with fault has been recovered.

* * * * *

UNITED STATES PATENT AND TRADEMARK OFFICE
CERTIFICATE OF CORRECTION

PATENT NO. : 8,619,548 B2  Page 1 of 1
APPLICATION NO. : 13/044263
DATED : December 31, 2013
INVENTOR(S) : Fang et al.

It is certified that error appears in the above-identified patent and that said Letters Patent is hereby corrected as shown below:

In the Claims

Column 8, Claim 1, line 28 "sending signals the direct channel" should read

--sending signals on the direct channel--.

Signed and Sealed this
First Day of April, 2014

Michelle K. Lee
*Deputy Director of the United States Patent and Trademark Office*